No. 849,500. PATENTED APR. 9, 1907.
H. ROMÜNDER.
WATER SOFTENER AND PURIFIER.
APPLICATION FILED MAR. 20, 1906.

4 SHEETS—SHEET 1.

Witnesses:
Carl E. Fiedler.
Ernst Lueders.

Inventor:
Hermann Romünder

No. 849,500. PATENTED APR. 9, 1907.
H. ROMÜNDER.
WATER SOFTENER AND PURIFIER.
APPLICATION FILED MAR. 20, 1906.

4 SHEETS—SHEET 3.

UNITED STATES PATENT OFFICE.

HERMANN ROMÜNDER, OF MILWAUKEE, WISCONSIN.

WATER SOFTENER AND PURIFIER.

No. 849,500.  Specification of Letters Patent.  Patented April 9, 1907.

Application filed March 20, 1906. Serial No. 306,961.

*To all whom it may concern:*

Be it known that I, HERMANN ROMÜNDER, of Milwaukee, Wisconsin, have invented a Water Softener and Purifier, of which the following is a specification.

This invention relates to water purifiers and softeners for water carrying carbonates and sulfates of lime and magnesium, which are treated by the well-known chemical processes, which consists in adding calcium hydrate and soda to the water to be purified and separating precipitates so caused.

The general type of purifier referred to is old and well known; and my invention consists in certain improvements applicable thereto.

One feature of my invention consists in certain means for causing the more uniform and rapid intermixture of the calcium-hydrate solution with the water to be purified. Another feature consists in novel and improved means for applying a fixed proportion of soda solution which is automatically regulated by the inflowing water; and a third feature consists in providing means for causing the thorough intermixture of the raw water, soda, and lime together in a downwardly-flowing current before the liquid is introduced into the settling-chamber.

For the clear comprehension of my invention I have illustrated it in the accompanying drawings, wherein—

Figure 1:
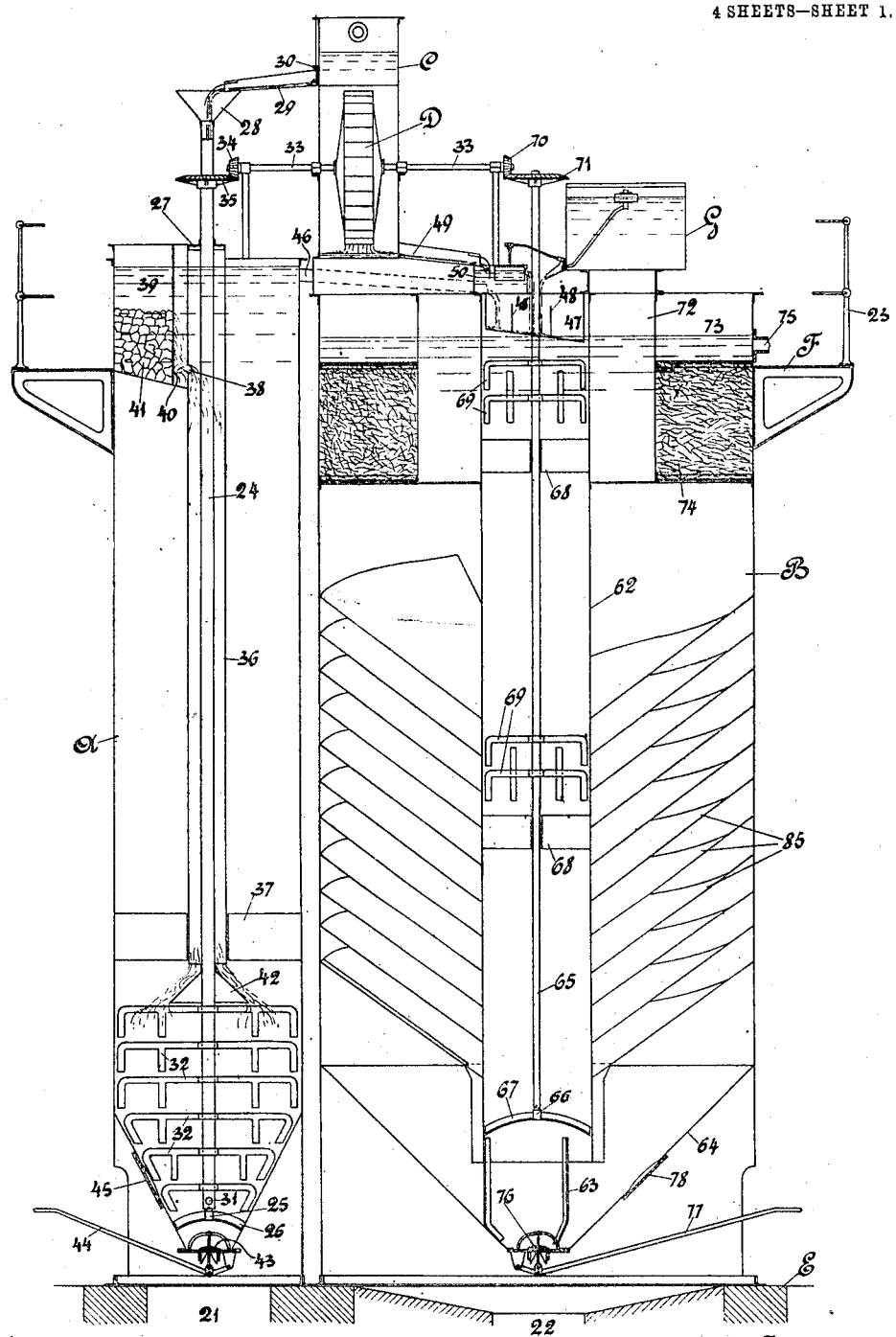
Figure 2:
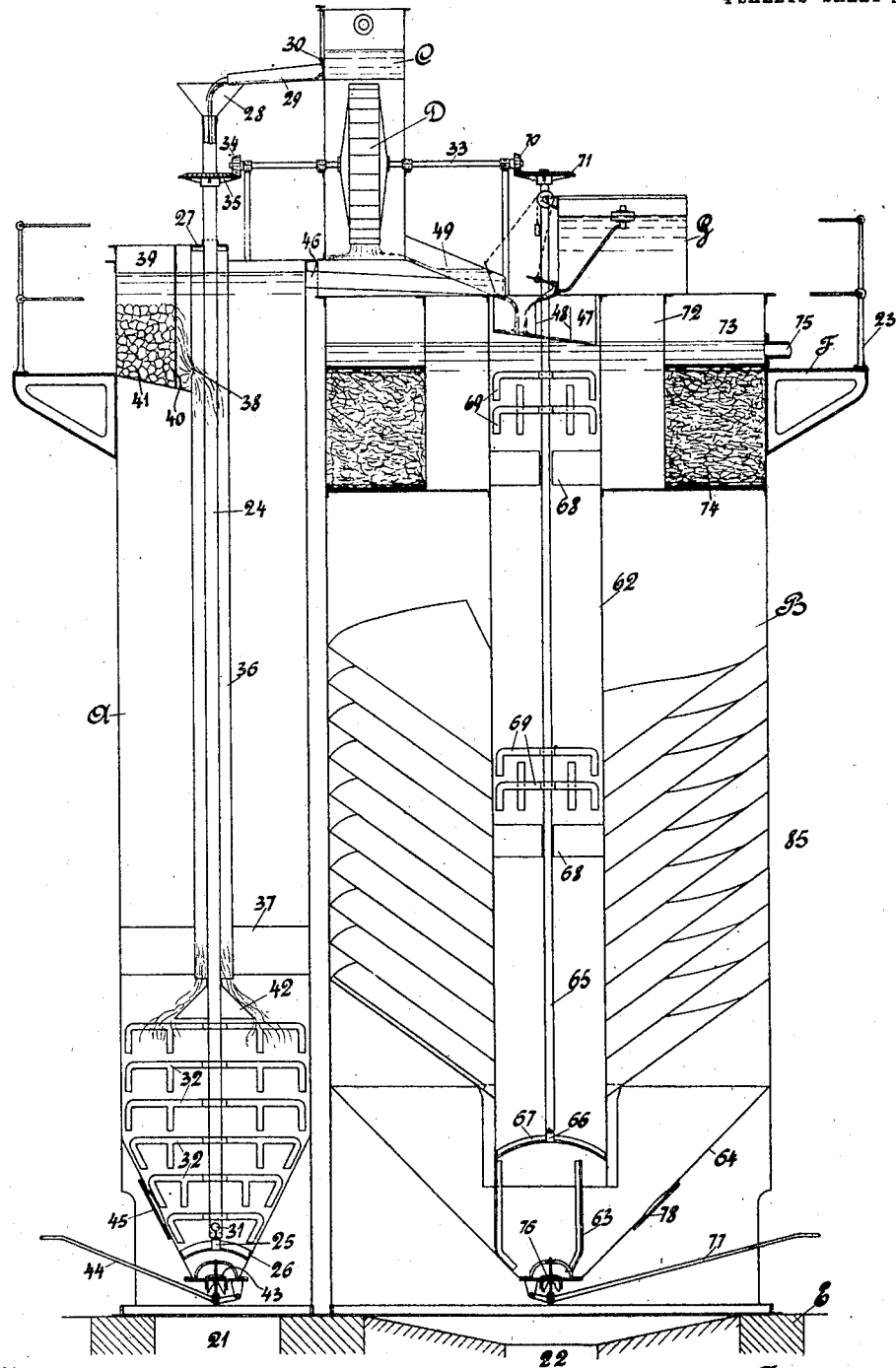
Figure 3:
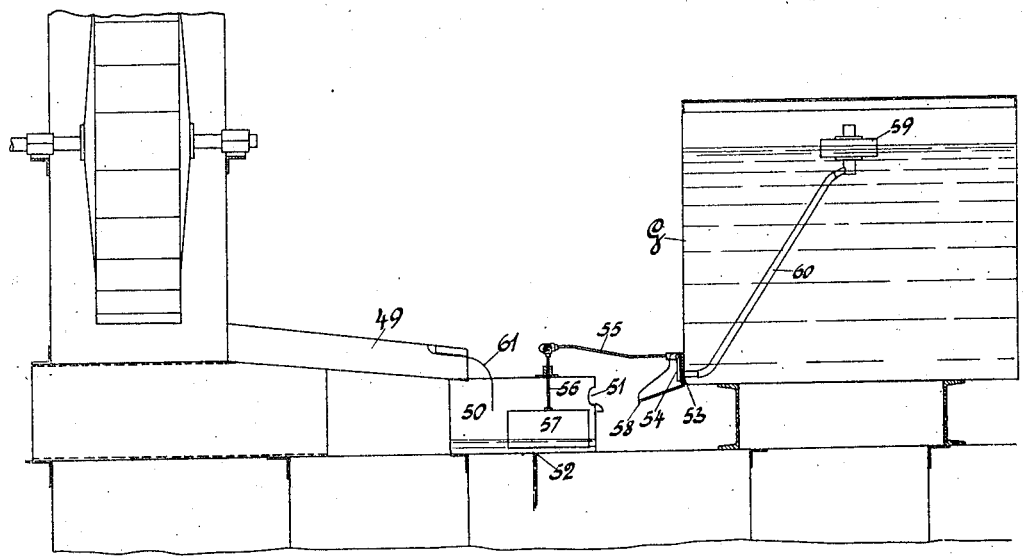
Figure 4:
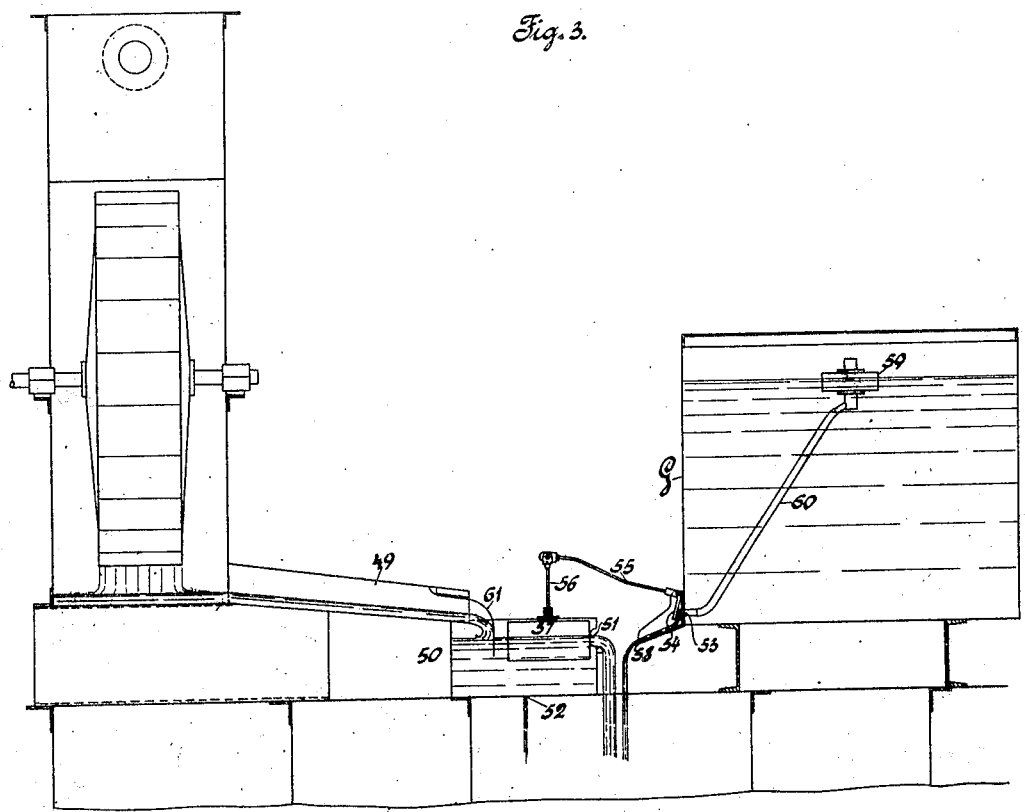
Figure 6:
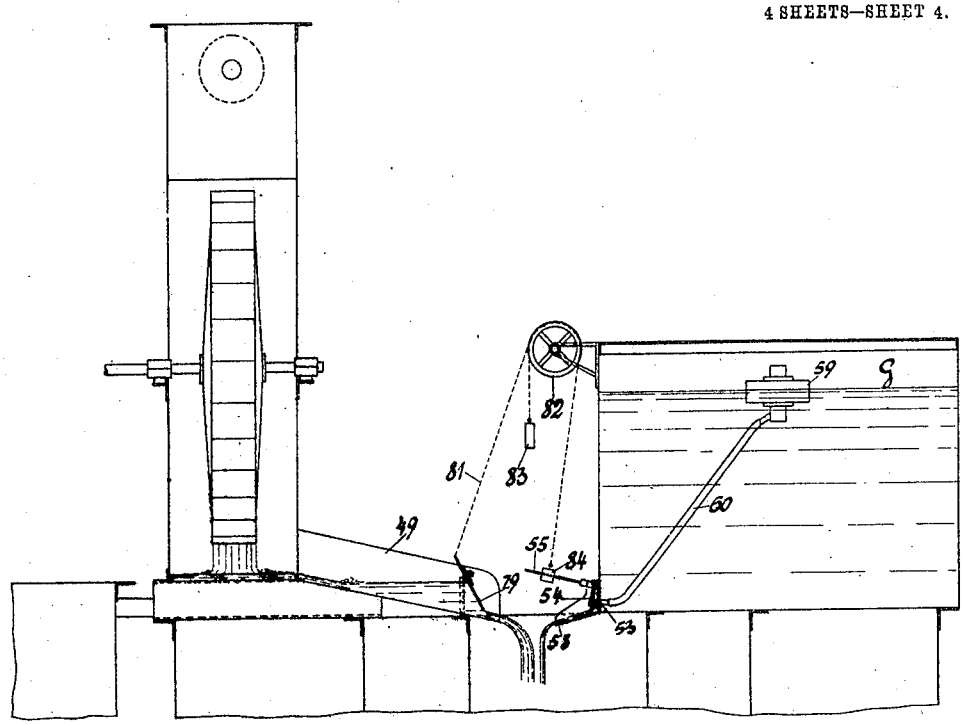
Figure 5:
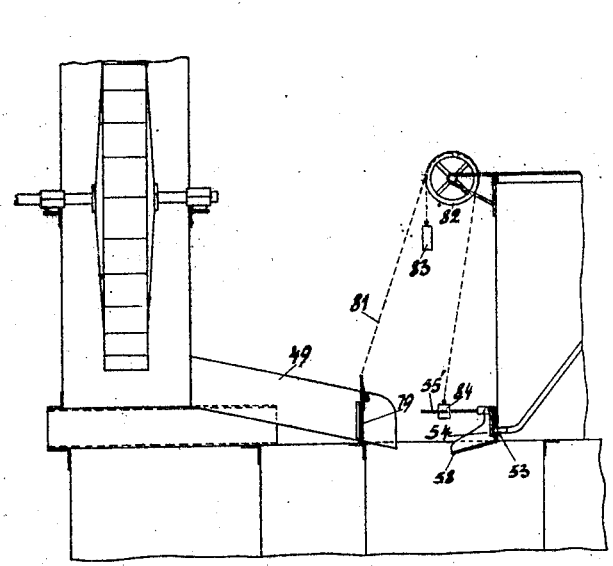
Figure 7:
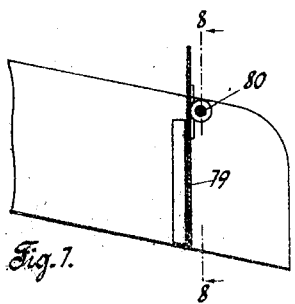
Figure 8:
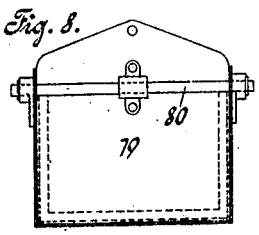

Figure 1 is a vertical median section through a complete apparatus as adapted to the larger sizes. Fig. 2 is a similar section of a machine adapted for the smaller sizes. Figs. 3 and 4 are each a vertical section, on an enlarged scale, through the upper part of the apparatus shown in Fig. 1 to illustrate more clearly the soda-regulating mechanism, Fig. 3 showing the soda-valve in closed and Fig. 4 in open position. Figs. 5 and 6 are similar sections through the form shown in Fig. 2 and illustrating the construction of the soda-regulating mechanism for this apparatus, these figures also showing the soda-valve respectively in closed and open positions. Fig. 7 is a longitudinal section, on a still further enlarged scale, of the lower part of the discharge-spout used in the same form of purifier, illustrating the valve-operating plate in section; and Fig. 8 is a transverse section through the same on the line 8.

In the drawings every reference character refers always to the same part.

Taking first the form shown in Fig. 1, there is shown a long and narrow cylindrical lime chamber or tank A, by the side of which is a somewhat larger settling chamber or tank B, the whole being surmounted by a raw-water tank C, below which is a water wheel or motor D, operated by the water in the tank C in its descent into the apparatus to keep the agitating mechanism of the apparatus in motion. The whole is mounted upon a suitable foundation E, providing exits 21 and 22 for the sludge matter and furnished with a platform F, having a railing 23 extending around the apparatus near the top for greater convenience of access.

The lime-tank A has concentrically mounted therein a hollow shaft 24, which extends from a point above the top of the tank to its extreme lower end, being mounted upon a suitable step-bearing 25, carried by a spider 26, and at its upper end it has also a bearing-collar 27 to hold it rotatably in position. It is provided at its upper end with a funnel 28, into which raw water is delivered from the tank C through a spout 29, having a valve 30. The valve is ordinarily automatically operated, but as such means form no part of this invention it is not herein shown. At its lower end the shaft 24 has lateral orifices 31, whereby the water delivered through the funnel 28 issues at the bottom of the tank A and gradually works its way to the top. The shaft carries at its lower end a set of agitating devices 32, and it is kept in rotation by the motor D, whose shaft 33 is connected therewith by means of bevel-gears 34 35, mounted on the shafts 33 and 24, respectively.

Surrounding the shaft 24 from a point above the water-level in the tank A is a tube or pipe 36, which descends to a point just above the agitators 32 and is supported by brackets 37 from the sides of the tank or otherwise. This tube 36 is entirely closed, except at its ends and at a lateral opening 38, by which the interior thereof is connected with a chamber 39, mounted at the side of the tank and separated from the main portion thereof, the said chamber 39 being provided with a vertical screen 40, behind which is placed quicklime 41. The water in the tank A rises through the tube 36 into the chamber 39 and acts upon the quicklime, dissolving it, and the milk-of-lime solution so produced slowly diffuses itself downward and escapes into the tank A through the lower end of the tube 36. I have provided as an important element of my invention a means for more quickly and thoroughly incorporating the lime solution with the water, consisting of a conical deflector 42, which throws it outwardly and prevents it from sinking directly to the bottom.

The water entering the tank A is freed from any calcium carbonate which it may hold in solution, which latter sinks to the bottom and is drawn off through a sludge-valve 43, operated by a lever 44 or otherwise, this constituting no part of my present invention. A hand-hole plate 45 at the side may also be provided for cleaning purposes. From the tank A the water containing an excess of lime passes by a spout or pipe 46, which carries it into a mixing-trough 47, having deflection-plates 48 arranged therein for causing it to be more thoroughly incorporated with raw water and soda, which are also introduced at this point.

The raw water flowing from the tank C at proper intervals operates upon the motor D and falls therefrom into the spout 49, which delivers it in this form of purifier into a smaller tank 50, which has a large overflow-opening 51 at one side and near the top and a small perforation 52 in the bottom. Adjacent to this tank is mounted the soda-tank G, which contains a concentrated soda solution and has at the bottom thereof an opening 53, which is normally covered by a flap-valve 54, having a lever 55, this lever being connected by a rod 56 with a float 57, which rises and falls with the level of water in the tank 50. From the opening 53 leads a spout 58, which delivers the soda solution to a point near the center of the trough 47. There is also herein illustrated a means for taking the solution always from the surface of the solution in the tank G in order that it may be delivered and flow through the opening 53 always at the same pressure, the said means comprising a float 59, which supports a flexible pipe 60, connected at its lower end with the opening 53, as shown, and opening at its upper end near the surface of the solution. The lower end of the spout 49 is also shown as provided with a deflecting-plate 61 to prevent the water delivered thereby from splashing upon the float 57.

The tank B is provided with a concentric tube 62, which is supported by legs 63 from the conical bottom 64 of the tank, whereby the lower end of said tube communicates freely with the interior of the tank. Within this tube is mounted a vertical shaft 65, which turns upon a step-bearing 66, supported on a spider 67 from the walls of the tube 62, said shaft being also supported by intermediate bearings 68. This shaft carries a series of agitating plates or paddles 69, and it is kept in rotation by the motor D, whose shaft 33 is connected therewith by gears 70 and 71, whereby the liquid descending through the tube 62 is thoroughly intermixed before reaching the settling-chamber. The latter may contain precipitating-shelves 85, and near its top is mounted another concentric cylindrical wall 72, forming an annular filter-chamber 73, in which is mounted a filter 74, through which the water passes on its way to the outlet-pipe 75. The bottom of the tank B is provided with the usual sludge-valve 76, operated by a lever 77, and with a manhole-plate 78, which gives access to the interior for cleaning purposes.

The mode of operation, generally speaking, is as follows: The water descending from the tank C through the spout 29 enters the lime-tank through the hollow shaft 24 and is there mixed with the lime solution, as previously described, rising to the top and passing out through the pipe 46 into the mixing-trough 47. Simultaneously the water falling from the tank C upon the motor D operates the latter to keep the shafts 24 and 65 in rotation, whereby the liquid is agitated and the solutions thoroughly incorporated. The water flowing from the motor through the spout 49 enters the tank 50 and rises therein until it overflows at the outlet 51, the small hole 52 being insufficient to carry out the water as rapidly as it enters, and thereby the float 57 is caused to rise and open the valve 54, delivering soda solution at a fixed rate from the tank G into the trough 47 along with the raw water which overflows thereinto and the lime solution from the pipe 46. This solution continues to flow as long as the water enters through the spout 49—that is to say, as long as the tank C contains water—but as soon as the water is cut off from the tank C the flow in the spout 49 ceases and the tank 50 is emptied by the outflow through the hole 52 in the bottom thereof, the float 57 accordingly sinking and closing the valve 54, so as to shut off the supply of soda. As soon as water again enters the tank C the whole cycle recommences.

For smaller sizes of the apparatus I may use a simpler form of the soda-regulating device, which is illustrated in Fig. 2 and Figs. 5 to 8, inclusive. In this form the tank 50 is omitted, and the spout 49 is provided with a sluice or trap in the form of a plate 79, which completely closes the outlet of the spout and is pivoted upon a pintle 80, extending across the spout near the top. The plate 79 extends somewhat above the pintle 80 to form means for connection of a cord or chain 81, which passes over a pulley 82, mounted on the side of the tank G, and is adjustably connected with the lever 55' of the valve 54 in such manner that the tipping of the plate 79 draws upon the connection 81, raises the lever 55', and so opens the valve 54. The weight of the cord and lever 55' may be counterbalanced by a weight 83, which also passes over the pulley 82, and the equilibrium further adjusted by a weight 84, slidable on the lever 55'. The normal position of the apparatus—that is, when not acted on by water—is as shown in Fig. 5. In operation the water accumulates in the spout 49 until its level is high enough to cause a pressure sufficient to open the valve 54 and then turns into the position shown in Fig. 6, discharging the water in the spout 49 and at the same time the proper quantity of soda solution. As soon as the water in the spout 49 is discharged the trap 79 closes again, being drawn downwardly by the excess of weight upon the lever 55', and remains in closed position until the water has again risen in the spout 49 sufficiently to open it.

I do not wish it understood that my invention is limited to the use of all the above-described features and constructions, for some may be omitted and others may be varied or modified in various ways, as will readily occur to those skilled in the art.

Having thus described my invention, what I claim as new, and desire to secure by Letters Patent, is—

1. In a water-softening device, a tank having a vertical shaft and means for rotating the same, agitating means carried by said shaft at the lower part thereof, a conical deflector mounted on said shaft above said agitating means, a tube surrounding the upper part of said shaft and terminating just above said deflector, and means for introducing a water-softening solution into said tube.

2. In a water-softening device, a lime-tank having a vertical shaft and means for rotating the same, agitating means carried by said shaft at the lower part thereof, a conical deflector mounted on said shaft above said agitating means, a tube surrounding the upper part of said shaft and terminating just above said deflector, and a quick lime-chamber connected with said tube and supplied with water therefrom.

3. In a water-softener, means for mixing chemicals with the raw water in a fixed proportion, the same comprising a mixing-receptacle, a reservoir for a chemical solution having an outlet adapted to deliver said solution into said mixing-receptacle, a valve closing said outlet, and a device connected with said valve and actuated by water flowing into said mixing-receptacle to open said valve, said device permitting said valve to close when no water is flowing into said receptacle.

4. In a water-softener, means for mixing chemicals with the raw water in a fixed proportion comprising a mixing-receptacle, a reservoir for a chemical solution having an outlet adapted to deliver said solution into said mixing-receptacle, a valve closing said outlet, a conduit delivering water to be softened into said mixing-receptacle, means between said conduit and said receptacle for storing the water before flowing into said receptacle and raising the water-level while flowing, said means permitting the sinking of the water-level immediately on water ceasing to flow through said conduit, and a device operated by said rise of level to open said valve and by the fall of level to close said valve.

5. In a water-softener, a mixing device comprising a tank, a float mounted therein, a reservoir for a chemical solution, a valve forming the outlet of said reservoir and adapted to admit said solution to the water to be softened, a connection between said valve and float whereby said valve is opened when said float is raised, and means for delivering a supply of water to said tank; said tank being arranged to overflow on the water reaching a fixed upper level and to empty itself as soon as the flow thereinto ceases whereby said valve is caused to close.

In witness whereof I have hereunto set my hand this 15th day of March, 1906.

HER. ROMÜNDER.

Witnesses:
　CARL S. FIEDLER,
　GEORGE W. COLLES.